(12) United States Patent
Batiz et al.

(10) Patent No.: US 9,449,231 B2
(45) Date of Patent: Sep. 20, 2016

(54) COMPUTERIZED SYSTEMS AND METHODS FOR GENERATING MODELS FOR IDENTIFYING THUMBNAIL IMAGES TO PROMOTE VIDEOS

(71) Applicant: AOL Advertising Inc., New York, NY (US)

(72) Inventors: Jaime Batiz, Campbell, CA (US); Niklas Karlsson, Mountain View, CA (US); Robert Luenberger, Los Altos, CA (US)

(73) Assignee: AOL Advertising Inc., New York, NY (US)

( * ) Notice: Subject to any disclaimer, the term of this patent is extended or adjusted under 35 U.S.C. 154(b) by 0 days.

(21) Appl. No.: 14/539,729

(22) Filed: Nov. 12, 2014

(65) Prior Publication Data

US 2015/0131967 A1 May 14, 2015

Related U.S. Application Data

(60) Provisional application No. 61/903,667, filed on Nov. 13, 2013.

(51) Int. Cl.
*H04N 9/80* (2006.01)
*G06K 9/00* (2006.01)
*G06K 9/62* (2006.01)

(52) U.S. Cl.
CPC ....... *G06K 9/00744* (2013.01); *G06K 9/00765* (2013.01); *G06K 9/6254* (2013.01)

(58) Field of Classification Search
CPC ............... H04N 21/482; H04N 21/44008; H04N 21/4325; H04N 21/43615; H04N 21/4728; H04N 5/775; H04N 5/147; H04N 5/44

See application file for complete search history.

(56) References Cited

U.S. PATENT DOCUMENTS 5,818,439 A * 10/1998 Nagasaka ......... G06F 17/30793
348/E7.073
6,990,462 B1 1/2006 Wilcox et al.
7,546,625 B1 6/2009 Kamangar
(Continued)

FOREIGN PATENT DOCUMENTS

JP 2005286798 A * 10/2005

OTHER PUBLICATIONS

International Search Report and Written Opinion for PCT/US2013/02281, mailed Mar. 29, 2013 (10 pages).
(Continued)

*Primary Examiner* — Huy T Nguyen
(74) *Attorney, Agent, or Firm* — Finnegan, Henderson, Farabow, Garrett & Dunner LLP

(57) ABSTRACT

Systems, methods, and computer-readable media are provided for generating and using models to select thumbnail images for videos. In one exemplary method, the method comprises extracting at least one thumbnail from a video and determining at least one feature present in the at least one thumbnail. The method further comprises sending the extracted at least one thumbnail to one of an editor or at least one viewer. The method further comprises receiving feedback information related to the at least one thumbnail. The method further comprises generating a model and storing the generated model for use in identifying thumbnails for other videos. The model can be generated based on the determined at least one feature and the received feedback information.

21 Claims, 5 Drawing Sheets

(56) References Cited

U.S. PATENT DOCUMENTS

| | | |
|---|---|---|
| 2001/0020236 A1 | 9/2001 | Cannon |
| 2002/0042738 A1 | 4/2002 | Srinivasan et al. |
| 2003/0074252 A1 | 4/2003 | Chandler-Pepelnjak et al. |
| 2003/0171990 A1 | 9/2003 | Rao et al. |
| 2004/0088241 A1 | 5/2004 | Rebane et al. |
| 2005/0021403 A1 | 1/2005 | Ozer et al. |
| 2005/0097204 A1 | 5/2005 | Horowitz et al. |
| 2005/0171844 A1 | 8/2005 | Ferber et al. |
| 2005/0209953 A1 | 9/2005 | Stubbs et al. |
| 2006/0041480 A1 | 2/2006 | Briggs |
| 2006/0047703 A1 | 3/2006 | Strober et al. |
| 2006/0074749 A1 | 4/2006 | Kline et al. |
| 2006/0080171 A1 | 4/2006 | Jardins et al. |
| 2006/0184421 A1 | 8/2006 | Lipsky et al. |
| 2006/0206355 A1 | 9/2006 | Cheung et al. |
| 2006/0224445 A1 | 10/2006 | Axe et al. |
| 2006/0224496 A1 | 10/2006 | Sandholm et al. |
| 2006/0230029 A1 | 10/2006 | Yan |
| 2006/0253319 A1 | 11/2006 | Chayes et al. |
| 2006/0280383 A1 | 12/2006 | Cheng et al. |
| 2006/0282328 A1 | 12/2006 | Gerace et al. |
| 2006/0282533 A1 | 12/2006 | Steelberg et al. |
| 2007/0006145 A1 | 1/2007 | Hill et al. |
| 2007/0022005 A1 | 1/2007 | Hanna |
| 2007/0027761 A1 | 2/2007 | Collins et al. |
| 2007/0027771 A1 | 2/2007 | Collins et al. |
| 2007/0028263 A1 | 2/2007 | Collins |
| 2007/0033105 A1 | 2/2007 | Collins et al. |
| 2007/0038508 A1 | 2/2007 | Jain et al. |
| 2007/0067267 A1 | 3/2007 | Ives |
| 2007/0078707 A1 | 4/2007 | Axe et al. |
| 2007/0088605 A1 | 4/2007 | Ghate et al. |
| 2007/0124194 A1 | 5/2007 | Barnette et al. |
| 2007/0130004 A1 | 6/2007 | Borgs et al. |
| 2007/0130009 A1 | 6/2007 | Steelberg et al. |
| 2007/0130014 A1 | 6/2007 | Altberg et al. |
| 2007/0143186 A1 | 6/2007 | Apple et al. |
| 2007/0162296 A1 | 7/2007 | Altberg et al. |
| 2007/0174114 A1 | 7/2007 | Bigby et al. |
| 2007/0265923 A1 | 11/2007 | Krassner et al. |
| 2007/0283388 A1 | 12/2007 | Del Beccaro et al. |
| 2008/0021791 A1 | 1/2008 | Steelberg et al. |
| 2008/0027802 A1 | 1/2008 | Mendelevitch et al. |
| 2008/0052219 A1 | 2/2008 | Sandholm et al. |
| 2008/0065479 A1 | 3/2008 | Tomlin et al. |
| 2008/0097813 A1 | 4/2008 | Collins |
| 2008/0103953 A1 | 5/2008 | Flake et al. |
| 2008/0126240 A1 | 5/2008 | Banbury et al. |
| 2008/0140489 A1 | 6/2008 | Berkhin et al. |
| 2008/0140524 A1 | 6/2008 | Anand et al. |
| 2008/0154707 A1 | 6/2008 | Mittal et al. |
| 2008/0162200 A1 | 7/2008 | O'Sullivan et al. |
| 2008/0195475 A1 | 8/2008 | Lambert et al. |
| 2008/0215418 A1 | 9/2008 | Kolve et al. |
| 2008/0225155 A1* | 9/2008 | Ebato .................. G11B 27/105 348/333.05 |
| 2008/0249834 A1 | 10/2008 | Zigmond et al. |
| 2008/0249855 A1 | 10/2008 | Collins et al. |
| 2008/0255915 A1 | 10/2008 | Collins et al. |
| 2008/0255921 A1 | 10/2008 | Flake et al. |
| 2008/0262913 A1 | 10/2008 | Reitz et al. |
| 2008/0270223 A1 | 10/2008 | Collins et al. |
| 2008/0275757 A1 | 11/2008 | Sharma et al. |
| 2008/0281627 A1 | 11/2008 | Chang et al. |
| 2009/0006145 A1 | 1/2009 | Duggal et al. |
| 2009/0037267 A1 | 2/2009 | Duggal et al. |
| 2009/0099904 A1 | 4/2009 | Affeld et al. |
| 2009/0157507 A1 | 6/2009 | Agius et al. |
| 2009/0210287 A1 | 8/2009 | Chickering et al. |
| 2010/0094878 A1 | 4/2010 | Soroca et al. |
| 2010/0138291 A1 | 6/2010 | Silverman et al. |
| 2010/0262455 A1 | 10/2010 | Karlsson et al. |
| 2010/0262497 A1 | 10/2010 | Karlsson |
| 2010/0262499 A1 | 10/2010 | Karlsson et al. |
| 2011/0051999 A1* | 3/2011 | Tu ........................ G06K 9/3216 382/103 |
| 2011/0131099 A1 | 6/2011 | Shields et al. |
| 2011/0246267 A1 | 10/2011 | Williams et al. |
| 2011/0276411 A1 | 11/2011 | McElfresh et al. |
| 2012/0150656 A1 | 6/2012 | Karidi et al. |
| 2013/0197994 A1 | 8/2013 | Karlsson et al. |
| 2015/0104154 A1* | 4/2015 | Fu ..................... G06F 17/30802 386/281 |

OTHER PUBLICATIONS

Search History for PCT Application No. PCT/US2013/022881, dated Mar. 13, 2013 (6 pages).
Google Analysis, "The Value of Landing Pages," Aug. 31, 2009 (9 pages).
"On the Faliure of the Linkage Principle with Financially Constrained Bidders: An Example" Dec. 13, 2000, by Fang et al. (24 pages).
International Search Report and Written Opinion issued in PCT/US2010/030341 on Oct. 4, 2010 (16 pages).
International Search Report and Written Opinion issued in PCT/US2010/030343 on Oct. 7, 2010 (9 pages).
International Search Report and Written Opinion issued in PCT/US2010/030347 on Oct. 8, 2010 (6 pages).
Jiang, et al., "Estimating Bidders Valuation Distribution in Online Auctions," University of British Columbia, 2005 (16 pages).
International Search Report and Written Opinion, issued for PCT/US14/57747, mailed on Apr. 13, 2015 (14 pages).
Chomsky: Ideas and ideals, Neil Smith, Cambridge University Press, 1999, p. 12.
Internet Archive version of "9.6. random—Generate pseudo-random numbers," https://docs.python.org/3.1/library/random.html; Mar. 26, 2010 (15 pages).

* cited by examiner

COMPUTERIZED SYSTEMS AND METHODS FOR GENERATING MODELS FOR IDENTIFYING THUMBNAIL IMAGES TO PROMOTE VIDEOS

CROSS-REFERENCE TO RELATED APPLICATION(S)

This application claims priority to U.S. Provisional Application No. 61/903,667, filed Nov. 13, 2013, the entire disclosure of which is expressly incorporated herein by reference to its entirety.

BACKGROUND

1. Technical Field

The present disclosure relates generally to the field of data processing and digital content systems. More particularly, and without limitation, the present disclosure relates to systems and methods for identifying thumbnail images for videos to, for example, attract interaction or interest from users.

2. Background Information

Publishers of content on the Internet tend to be dependent upon advertising for revenue. For example, various types of web sites, blogs, social networks, and web-based service sites use advertising as a significant source of income to offset the costs associated with offering content and/or services to their users. When a user requests a specific web page, a corresponding web server (either alone or in conjunction with other servers), may identify advertisements or promotions to be displayed as part of the web page. For example, a server may attach instructions for a client computer to request an appropriate promotion from an ad server. Additionally, or alternatively, instructions may be provided to insert an image or other content associated with the promotion into the web page.

In some situations, advertisements or content promoted to users may be in the form of videos. There are many example situations where a publisher may present advertisements or content to a user in the form of a video. For example, a company might develop a promotional video to advertise a new product. A news organization may create videos of news reports to increase traffic to its website. A "viral" video creator could want to drive traffic to his videos because of advertising embedded in each video. A gadget enthusiast website may provide "how to" videos demonstrating how to use various electronic devices to users that are browsing news articles about those electronic devices. Producers or directors may create trailers (e.g., previews) of their shows, movies, or documentaries to a website for display to users. Non-profit organizations may create video testimonials from their beneficiaries in order to entice users to donate. Video game enthusiasts may create "speedrun" or "walk-through" videos that demonstrate how to accomplish a particular goal in a video game. In addition, when searching a database or other resource (including the Internet) to identify relevant videos, it may be desirable to provide information about the identified videos as part of the search results displayed to a user. Whatever the situation, there are many situations where driving traffic to videos or otherwise conveying information about the videos is desirable.

However, attempting to drive traffic to or provide information about such videos using text hyperlinks and/or descriptions can have mixed results. For example, if a series of hyperlinks and/or descriptions are listed on a web page and only some of those links lead to videos, users may not notice that certain links lead to videos and may not click on the links.

Some websites promote videos to users using thumbnails of the videos (e.g., specific images extracted from a video). These thumbnail images may be automatically selected. For example, the first frame of the video may be automatically selected as the thumbnail for a video. However, if the first frame of the video is a black frame or is otherwise non-unique, the selected thumbnail image may fail to attract interest from users.

Thumbnails may also be selected manually by a person (e.g., an editor). However, this is time-consuming in that it requires a person to go through each video to select a thumbnail from that video, keeping in mind that the thumbnail should attract users.

In view of the foregoing, there is a need for improved systems and methods for selecting thumbnail images for videos. The selected thumbnails may be used in promoting or identifying videos to users. One of ordinary skill will understand from this disclosure that other uses for the presented embodiments are possible as well.

SUMMARY

Embodiments of the present disclosure include computerized systems and methods for selecting thumbnail images for videos. The thumbnails may be used in promoting or identifying videos to users. Other embodiments and features are also presented in this disclosure.

In one embodiment, a computer-implemented method is provided for generating a model. The method is performed by at least one processor and comprises extracting at least one thumbnail from a video and determining at least one feature present in the at least one thumbnail. The method further comprises sending the extracted at least one thumbnail to one of an editor or at least one viewer, and based on sending the extracted at least one thumbnail to an editor or at least one viewer, receiving feedback information. The method further comprises generating a model based on the determined features and the feedback information. The model may be stored and used to select thumbnails from other videos.

Computer-readable media and systems implementing the above method are also provided in this disclosure. Additional embodiments and related features of the present disclosure are described herein.

BRIEF DESCRIPTION OF THE DRAWINGS

The accompanying drawings, which are incorporated in and constitute a part of this disclosure, illustrate several embodiments and aspects of the present disclosure, and together with the description, serve to explain certain principles of the presently disclosed embodiments.

DETAILED DESCRIPTION OF EXEMPLARY EMBODIMENTS

Figure 1:
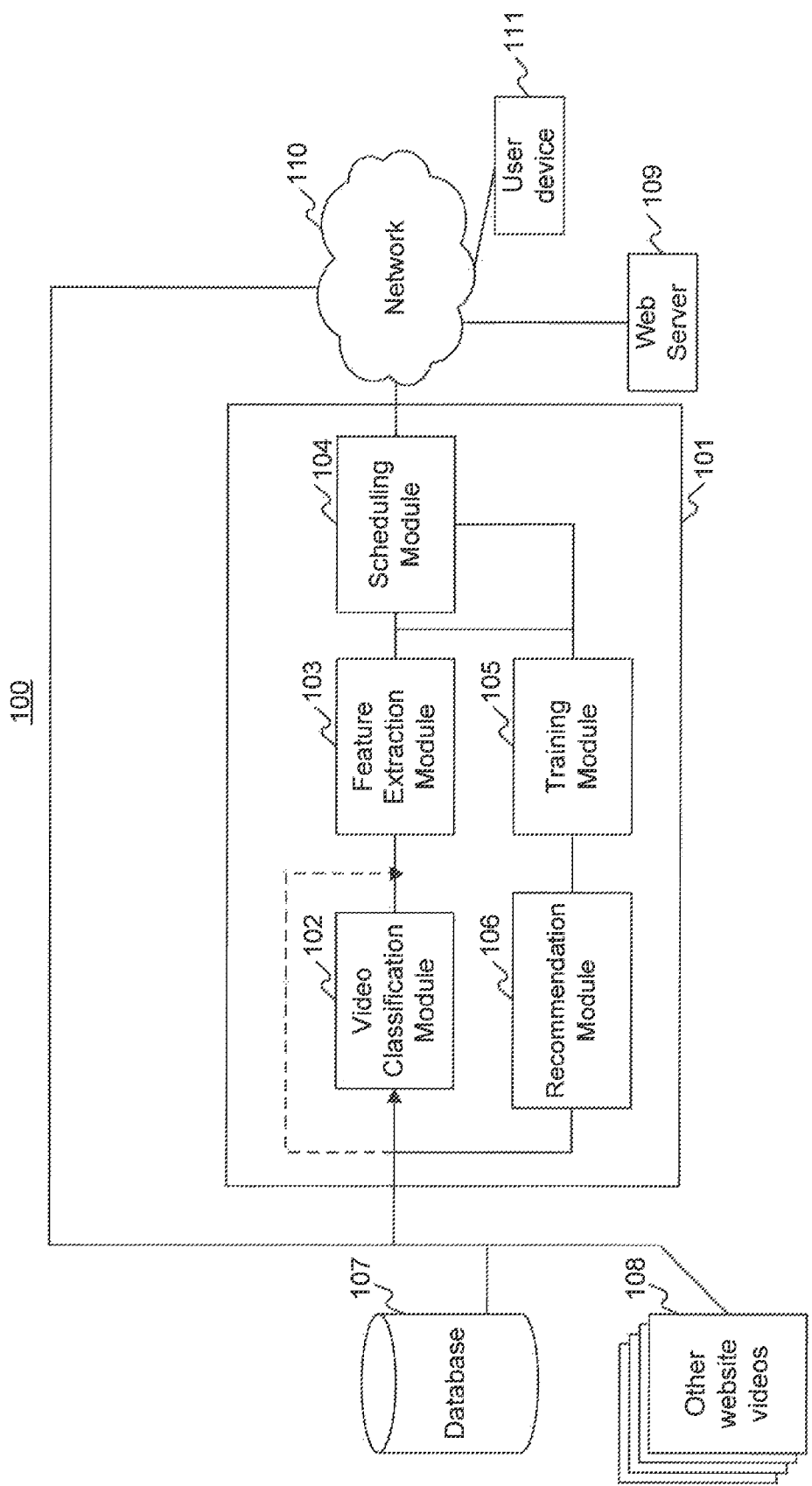
FIG. 1 illustrates an exemplary system environment for implementing embodiments of the present disclosure.

Some embodiments of the present disclosure will now be described. One of ordinary skill will understand that variations from these embodiments is possible FIG. 1 illustrates an exemplary system environment 100 for implementing embodiments of the present disclosure. As shown in FIG. 1, system environment 100 includes video analysis system 101, database 107, other website videos 108, web server 109, network 110, and user device 111. Each of these devices may be implemented as hardware, software, firmware, or a combination thereof. The number and arrangement of components in FIG. 1 is presented for purposes of illustration. Additions, modifications, and substitutions can be made to these components, as needed. Signals or data may be sent between these devices.

Video analysis system 101 comprises video classification module 102, feature extraction module 103, scheduling module 104, training module 105, and recommendation module 106. Each of these modules may be implemented as hardware, software, firmware, or a combination thereof. Signals or data may be sent between these modules.

Video classification module 102 receives videos (for example, from database 106 or other website videos 107). In some situations, video classification module 102 receives videos in response to an indexing operation, where a set of videos is accessed and analyzed as a group. In other situations, video classification module 102 may receive a single video in response to a person, such as an editor, providing the video to video classification module 102 (e.g., by inputting a link to video classification module 102).

Video classification module 102 may be configured to receive a video and determine classifications associated with the video. For example, video classification module 102 can receive a news report about a disease outbreak in the U.S. or Europe and determine that the video should be associated with the "news" classification (e.g., as opposed to "sports" or "entertainment" classifications). In some embodiments, video classification module 102 may determine classifications associated with the video by determining or analyzing metadata, tags, or other information associated with the video. For example, the video may have information embedded indicating the video's source, content, and/or keywords. Video classification module 102 may use this information to assign one or more classifications to the video. The video may also be hosted on a website that indicates a possible classification for the video. For example, if the video is hosted on a website that hosts funny videos, video classification module 102 may determine that the video should be assigned to the "funny" classification (e.g., as opposed to a "documentary" or "drama" classification).

In other embodiments, video classification module 102 may determine classifications associated with the video by analyzing elements of the video itself. For example, video classification module 102 may be configured to determine the frame rate of a particular video. Video classification module 102 may also be configured to analyze elements of received videos by extracting images from the videos received by video classification module 102. For example, video classification module 102 may be configured to extract images from each received video and determine the elements from each image. Elements analyzed from each image include, for example, the presence or absence of humans (e.g., facial features, bodies, hair, eyes, mouths, or other body parts), genders or number of humans in the image, the time of day represented in the image, text displayed in the image, objects seen in the image (e.g., number of objects, shapes, particular object types), blurriness of an extracted image, colors in the image, how representative the image is of all images extracted from the video (e.g., the similarity of the extracted image to other images from the video), or other elements or information.

Based on the elements of received videos, video classification module 102 may be configured to determine that the video should be associated with a particular classification. For example, if the received video has a high frame rate with fast-moving action sequences, video classification module 102 may be configured to assign the video to the "action" classification (e.g., as opposed to a "documentary" or "news" classification).

In some embodiments, video classification module 102 may be configured to implement a training algorithm that creates a model for determining a classification associated with the video. For example, video classification module 102 may generate models for each available classification (e.g., "news," "action," "documentary"). Video classification module 102 may be configured to determine features that are present in a large proportion (e.g., 50%) of videos or associated thumbnails assigned to a particular classification, and assign those features to the model associated with the classification. Video classification module 102 may be configured to utilize the model in determining the classification of previously classified or unclassified videos. However, not all embodiments require that videos be associated with particular classifications.

Feature extraction module 103 receives videos from video classification module 102 or from video sources (such as database 107 or other website videos 108). Feature extraction module 103 extracts images from a received video for use as "thumbnails" or "poster frames" for promoting the video. Promoting the video includes, for example, using thumbnails to promote or provide information for the video to a user viewing web page.

Feature extraction module 103 may identify thumbnails using a set of criteria tailored to determine "interesting" images. That is, the extracted thumbnails may be chosen to comprise a set of thumbnails that differ from one another (e.g., at least half of the pixels in the thumbnail being different from another thumbnail) and may exclude thumbnails that are not suitable for thumbnail selection (e.g., logo associated with the entity that created the video, or thumbnails that are too blurry or consist of a single color). Feature extraction module 103 may identify such thumbnails based on features such as the presence or absence of humans (e.g., facial features, bodies, hair, eyes, mouths, or other body parts), genders or number of humans in the images, the time of day, text displayed in the images, objects present in the images (e.g., number of objects, shapes, particular object types), blurriness of extracted images, colors in the images, how representative the images are of all images extracted from the video (e.g., the similarity of the extracted image to other images from the video), or other elements or information.

In some embodiments, feature extraction module 103 may be configured to extract images from a video in a variety of ways. In a first example, feature extraction module 103 may be configured to receive a set of n thumbnails ($TN_0$, $TN_1$, $TN_2$, ... $TN_{n-1}$) and begin a "linear search" of those thumbnails. The linear search comprises, for example, comparing one thumbnail to a recently extracted thumbnail to determine if those thumbnails differ from one another by some threshold amount. In a second example, feature extraction module 103 may be configured to compare a current thumbnail (e.g., a candidate thumbnail that is being considered to represent a video) to all previously extracted thumbnails to determine whether the current thumbnail differs from the other thumbnails by some threshold amount.

In either of the above examples, the difference between thumbnails may be determined in a variety of ways. For instance, feature extraction module 103 may determine a value representing how much two extracted thumbnails ($TN_m$ and $TN_p$ each being x*y pixels) differ from one another by determining a normalized sum of the absolute value of the differences in pixel data between the thumbnails $$\left(e.g., \sum_{\substack{\forall i \in x, \\ \forall j \in y}} |TN_m^{(i,j)} - TN_p^{(i,j)}|\right),$$

a normalized sum of the absolute value of the squared differences of pixel data $$\left(e.g., \sum_{\substack{\forall i \in x, \\ \forall j \in y}} (TN_m^{(i,j)} - TN_p^{(i,j)})^2\right),$$

or the like. If the value representing how much thumbnails $TN_m$ and $TN_p$ differ from one another is greater than some threshold, feature extraction module 103 may determine that thumbnails $TN_m$ and $TN_p$ are "unique" from one another. In some embodiments, texture filtering—a method for smoothing various pixels together to determine the color of texture mapped pixels—may be used to determine the color of pixels in each thumbnail, using the variance data associated with that thumbnail.

Feature extraction module 103 may be configured to send the at least one thumbnail to a person (such as an editor) to enable the selection of thumbnails for promoting the video. Such a person may manually select thumbnails for promoting the video on other web pages. For example, an editor may be tasked with selecting a thumbnail that fits in with a particular theme, such as a thumbnail with a red background or a thumbnail with multiple smiling people in the frame. The editor may also select thumbnails based on other criteria. Feature extraction module 103 may be configured to receive data on which thumbnails were selected by the editor, as feedback information.

Feature extraction module 103 may also be configured to send the at least one thumbnail to scheduling module 104. Scheduling module 104 may be configured to receive thumbnails for insertion into web pages as promotions for their associated videos. For example, scheduling module 104 may be configured to work in conjunction with web server 109 to insert thumbnails as promotions in web pages hosted by web server 109. For example, when a user requests a web page from web server 109, web server 109 may contact scheduling module 104 to receive thumbnails and a reference to an associated video for displaying in a web page hosted by web server 109.

Scheduling module 104 may also be configured to receive, as feedback information, viewer response data from web server 109. Such information includes, for example, viewer response data related to the display of those thumbnails. For example, scheduling module 104 may be configured to receive feedback information related to how often particular thumbnails were displayed to or interacted with by users. Feedback information with a thumbnail can include, for example, a number of clicks on a thumbnail or how long a user hovers a mouse pointer over a thumbnail. In some embodiments, such feedback information can be segmented into different user groups. For example, one set of data may relate to viewer response data for users between the ages of 14 and 19, and another set of data may relate to male viewers from a specific country, such as Thailand.

Training module 105 may be configured to generate a model for identifying thumbnails that are likely to elicit a response from a user. The model can be based on thumbnails associated with viewer response data (e.g., data gathered during a process of being displayed to users) and/or based on thumbnails selected by an editor for display to users. The model can take a variety of forms—such as a set of rules, algorithm steps, mathematical expression(s) or function(s), or the like. As one example, the model may be represented by an object created using the R language (also referred to as the "R Project for Statistical Computing"). The object may represent several decision trees weighted by multi-dimensional factors.

The factors that are used in the model may represent a variety of concepts and enable the classification of thumbnails into a variety of groups. In one embodiment, the model may be used to classify thumbnails between two groups—a "top thumbnail" group (e.g., thumbnails that are likely to elicit a response from a user) and a "not a top thumbnail" group (e.g., thumbnails that are unlikely to elicit a high response from a user). In another embodiment, the model may be used to classify thumbnails between more than two groups. For example, the model may be used to classify each thumbnail as being related to a particular portion of an associated video or a particular event in the associated video, such as a title sequence, an end sequence, a head shot, or a group shot. The model may also be used to classify a thumbnail as "rejected" if the thumbnail should not be used to represent the video.

In another embodiment, the model may be used to represent an estimated response rate for a thumbnail. For example, the model may represent a click probability where a thumbnail is classified into one group if the model estimates that the thumbnail will receive one click for every 1,000 impressions, and is classified into a second group if the model estimates that the thumbnail will receive less than one click for every 1,000 impressions. Other response rates may be measured using such a model, such as a probability of a partial roll (e.g., a user moving a cursor over a thumbnail without clicking on it), probability of a hover-over (i.e., a user moving a cursor over a thumbnail and leaving it on the thumbnail for a period of time) or the like. The model may be utilized by a module (such as recommendation module 106) to determine whether a particular thumbnail is likely to receive one or more clicks by one or more viewers and/or whether the thumbnail should be used to promote the associated video.

For example, in the case of thumbnails associated with viewer response data from web server 109, training module 105 may be configured to generate a model using the displayed thumbnails, the features extracted from the thumbnails, and the associated viewer response data, to determine which features are most attractive to particular users. For example, assume ten separate thumbnails are presented to users to promote a video, and assume that five of these thumbnails depict action scenes. If these five thumbnails receive considerably more clicks or other interactions than the other five thumbnails used to promote the video, training module 105 may be configured to determine that presenting action scenes to users can yield more interactions.

Models can also be generated on a per-viewer segment basis. That is, training module 105 may be configured to tailor each model to select thumbnails for display to particular groups of viewers. For example, one model may be tailored to generate thumbnails for male viewers under the age of 21, while a second model may be tailored to generate thumbnails for female viewers between the ages of 29-39 with two kids and an annual household income of $100,000 or more.

In situations where an editor chooses thumbnails, training module 105 may be configured to generate a model using the selected thumbnails and the features extracted from the thumbnails by feature extraction module 103. Training module 105 may generate a model that reflects the type of thumbnails chosen by an editor for the video.

The model generated by training module 105 may vary depending upon the implementation. For example, in some embodiments, the model can be implemented as a set of rules. The rules can represent particular features or characteristics of images in Boolean ("true/false") form. An example rule could be represented as "IF the image contains at least one human AND the eyes of at least one human are open AND the mouth is smiling AND NOT the image is blurry THEN display this image."

In other embodiments, the model can be implemented as a mathematical expression or function. Training module 105 may determine a value corresponding to each variation of each feature, and based on the features determined for each image extracted from a video, decide whether to display the extracted image. For example, assume training module 105 assigns a point value of 10 to an image for each human in the image, a point value of 20 to a non-blurry image, a point value of 15 to an image where the most common color in the image is not red, and a point value of 50 to an image with three or more non-human objects in it. Training module 105 can then set a minimum value for displaying an image, and can sum up the values corresponding to features for each extracted image to determine whether to show the image. For example, assume that the minimum value is 40 points.

In some embodiments, training module 105 may also be configured to utilize boosting algorithms to determine which thumbnails are likely to be high-performing (e.g., receive many interactions) and which are not likely to be high-performing. Boosting algorithms, such as Adaboost, enable the use of multiple "weak classifiers" (or "weak learners") such as decision trees to produce results that, together, produce a stronger end result. In some embodiments, training module 105 may utilize a boosting algorithm by implementing decision trees, each of which implements one or more "if/then" rules for determining whether a thumbnail should be classified as a "top thumbnail" or "not a top thumbnail." Training module 105 may evaluate each thumbnail using one or more decision trees to classify each thumbnail into one of these groups. Training module 105 may compare the output of a first decision tree (e.g., "top thumbnail" or "not a top thumbnail") with the actual classification of the thumbnail (e.g., based on performance of the thumbnail) to determine the accuracy of the first decision tree. Training module 105 may determine which thumbnails were misclassified by the first decision tree and evaluate the misclassified thumbnails over a second decision tree. Training module 105 may then evaluate thumbnails that were misclassified by the second decision tree over a third decision tree, and so on. Training module 105 may then determine weights for each decision tree based on the percentage of thumbnails misclassified by each decision tree. Training module 105 generates a score for each thumbnail based on the weights associated with each decision tree.

In some embodiments, training module 105 may be configured to include information in the model about the relevance of each feature to the overall model, the quality or reliability of the model (e.g., determined through feedback information related to display of thumbnails selected using models), a number of iterations or modifications to the model (indicating, for example, how many times the model has been modified or adjusted), or the like.

In some embodiments, training module 105 may be configured to generate a different type of model based on classifications assigned to videos. For example, if a thumbnail is extracted from a video associated with a "news" classification, the thumbnail (and any viewer response data related to it) can be used as input for generating a model related to videos that have been assigned to the "news" classification, while the thumbnail and viewer response data would not be used as input for generating a model related to the "sports" classification of videos.

Recommendation module 106 may be configured to receive as input at least one model (e.g., from training module 105) and a set of images extracted from a video. Recommendation module 106 may be configured to utilize the model to determine which of the set of extracted images should be used to promote the video. For example, if a model indicates that thumbnails with a red background yield a high amount of interaction, recommendation module 106 may select a higher number of thumbnails with a red background.

In some embodiments, recommendation module 106 may be configured to determine which images are likely to yield high interaction based on particular segments of viewers. For example, the model may indicate that thumbnails with the face of a woman in them yields high interaction with male users from the San Francisco area between the ages of 18 and 29, while thumbnails with the face of a man in them yields high interaction with female users from the New York City area between the ages of 35 and 49.

In some embodiments, recommendation module 106 may be configured to utilize a model created by training module 105 to classify a new video's thumbnails as either a "top thumbnail," or "not a top thumbnail." Recommendation module 106 may also be configured to utilize a different model based on classifications assigned to a received video. For example, if recommendation module 106 receives a video assigned to the "news" classification, recommendation module 106 may utilize a model assigned to the same "news" classification in determining which thumbnails are likely to yield the most interaction for such videos (e.g., as opposed to a model assigned to a "drama" classification).

Database 107 may be implemented as storage for videos and other data. For example, database 107 may store one or more videos for use by the above-described modules that comprise video analysis system 101. Database 107 may be accessed by other devices connected to network 110 (such as video analysis system 101, user device 111 or web server 109). This enables those other devices to receive videos stored in database 107. For example, video analysis system 101 may access database 107 to receive one or more videos for analyzing or extracting thumbnails, web server 109 may access database 107 to receive one or more videos for embedding on web pages hosted by web server 109, and user device 111 may receive videos by clicking on links leading to videos stored in database 107.

Other website videos 108 include, for example, videos hosted on websites that are not owned or otherwise controlled by the same entity that operated video analysis system 101. For example, if video analysis system 101 is operated by an advertising company, other website videos 108 could be hosted by websites such as viral content websites, news organizations, library websites, universities, or other institutions/organizations unaffiliated with the advertising company that operates video analysis system 101. Other website videos 108 may be accessed by other devices connected to network 110 (such as video analysis system 101, user device 111 or web server 109). This enables those other devices to receive videos stored in other website videos 108. For example, video analysis system 101 may access other website videos 108 to receive one or more videos for analyzing or extracting thumbnails, web server 109 may access other website videos 108 to receive one or more videos for embedding on web pages hosted by web server 109, and user device 111 may receive videos by clicking on links leading to videos stored in other website videos 108.

Web server 109 may be implemented as software on an electronic device (such as a computer) for serving web pages. These web pages may include videos (known as "embedded videos") from database 107, other website videos 108, or other systems. Web server 109 may also deliver videos directly to user device 111 without embedding the videos in a web page. In either situation, web server 109 may track and store data on interaction from user device 111. Feedback information includes, for example, click-through or other data indicating the identity of a video watched by user device 111, a length of time indicating how long a video was rendered for on user device 111, a number of clicks or interactions with thumbnails embedded in web pages hosted on web server 109, or the like. Web server 109 can also store data related to interactions, including, for example, time or date of interactions with thumbnails, context related to interactions with thumbnails (e.g., whether the interaction occurred on a computer or a mobile device, or whether the website was reached by the viewer by clicking a link from another page), or information concerning the viewer that interacted with the thumbnails.

User device 111 represents a device utilized by a user. Examples of such a device include, for example, a personal computer, a mobile device, a tablet, a laptop, or the like. User device 111 may access web pages delivered by web server 109 that have videos embedded thereon. User device 111 may also view videos hosted by database 107 or other website videos 108.

Figure 2:
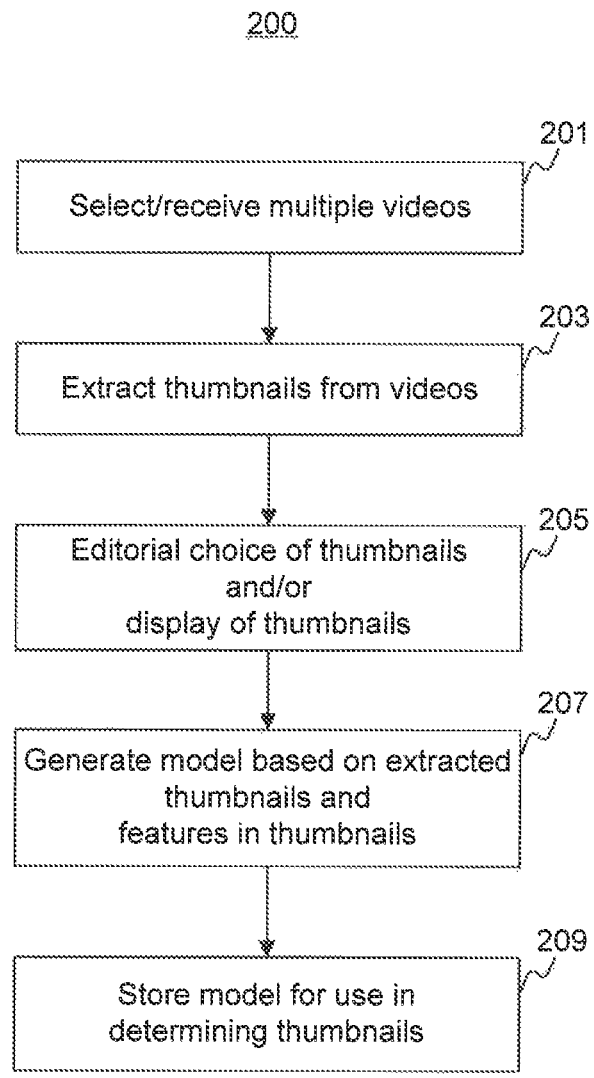
FIG. 2 illustrates a flowchart of an exemplary process for generating a model for selecting thumbnails from a video, consistent with embodiments of the present disclosure.

FIG. 2 illustrates a flowchart of an exemplary process 200 for generating a model for use with the embodiments of the present disclosure. Process 200 starts at step 201. In step 201, video analysis system 101 receives one or more videos. For example, video analysis system 101 may receive videos from database 107 or other website videos 108. In other embodiments, video analysis system 101 may also receive a selection of a video from database 107 or other website videos 108. For example, an editor operating video analysis system 101 may select one or more videos from database 107 or other website videos 108, and video analysis system 101 may not actually retrieve the entirety of such videos in step 201 but could receive a portion of such videos.

In step 203, video analysis system 101 extracts thumbnails from the one or more videos received in step 201. For example, feature extraction module 103 may receive the one or more videos (or links to the one or more videos) received in step 201, and may extract one or more thumbnails from those videos. These thumbnails may be extracted in accordance with a set of rules for extracting thumbnails, such as only extracting thumbnails that are sufficiently different or unique from one another, or not extracting as thumbnails blurry images or images substantially consisting of logos associated with the creator of the video. As explained above, feature extraction module 103 may extract thumbnails that are sufficiently different from one another based on comparisons between pixel values of each thumbnail. Step 203 also represents feature extraction module 103 determining features from the extracted thumbnails.

In step 205, video analysis system 101 may operate on the extracted thumbnails. In some embodiments, thumbnails may be presented to a person (e.g., an editor) for selecting the thumbnails that will be used to promote associated videos. This person may manually select thumbnails for promoting the one or more videos on other web pages. For example, an editor may be tasked with selecting a thumbnail that fits in with a particular theme (such as a thumbnail with a red background or a thumbnail with multiple people in the frame). The editor may also select thumbnails based on other criteria.

Step 205 also represents a step where thumbnails are displayed on a web page (for example, a web page hosted and delivered by web server 109). User device 111 may request a web page from web server 109, and web server 109 may receive one or more thumbnails (e.g., from scheduling module 104) for embedding in the web page. Web server 109 may be configured to deliver that web page to user device 111 with such thumbnails embedded. A user operating user device 111 may then click one or more of these embedded thumbnails, and video analysis system 101 may then receive feedback information related to the thumbnails delivered to user device 111.

In step 207, video analysis system 101 generates a model based on the thumbnails selected or displayed in step 205. Step 207 may be performed in part by training module 105. For example, training module 105 may determine features in each thumbnail to determine the features that should be used to generate the model. Training module 105 may also be configured to determine the features in thumbnails that were not displayed, criteria used by an editor to select thumbnails for display, information about a viewer segment chosen for targeting with the thumbnails, a classification associated with a video from which thumbnails were extracted, or the like. So, if an editor selects thumbnails from a video in step 205, training module 105 may determine features that are consistent between a majority of the thumbnails selected by that editor.

If thumbnails are instead presented to user device 111 by being embedded in a web page by web server 109, training module 105 may determine features that are consistent between a majority of the thumbnails that receive a high number of interactions from users. For example, assume ten separate thumbnails are presented to users to promote a video, and assume that five of these thumbnails depict action scenes. If these five thumbnails receive considerably more clicks or other interactions than the other five thumbnails used to promote that video, training module 105 can determine that presenting action scenes to users can yield more thumbnail interactions, and can generate a model that favors presenting images depicting action scenes.

In step 209, training module 105 may store the generated model. The model is stored for use in selecting or identifying thumbnails from other videos. In some embodiments, the model can be stored in a database (such as database 107).

Figure 3:
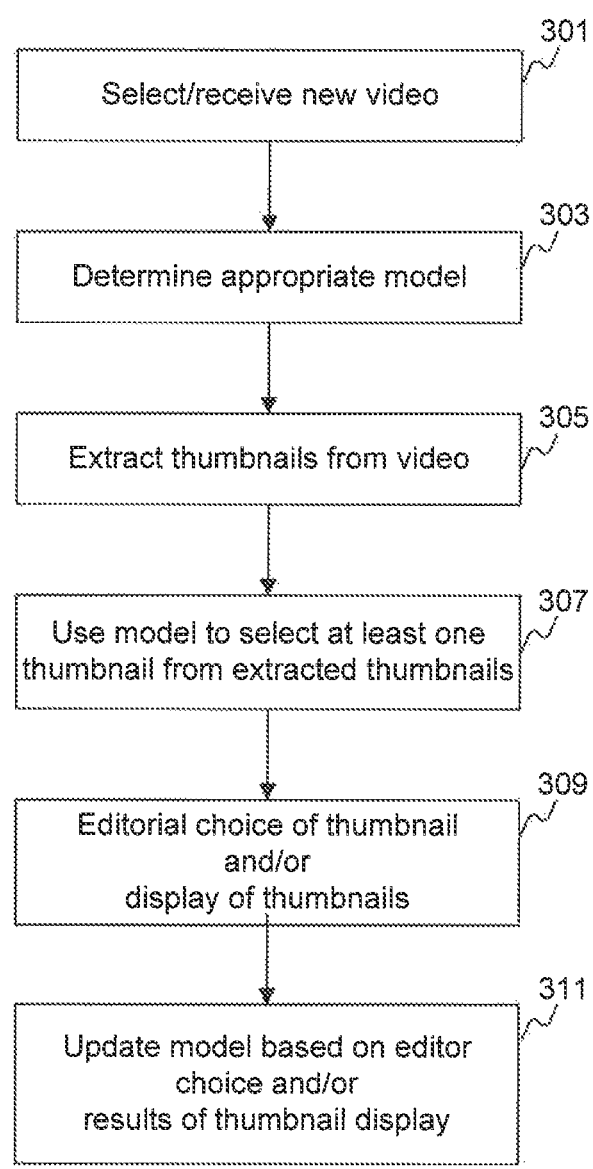
FIG. 3 illustrates a flowchart of an exemplary process for utilizing a model to select thumbnails from a video, consistent with embodiments of the present disclosure.

FIG. 3 illustrates a flowchart of an exemplary process 300 for utilizing a stored model to select thumbnails from at least one video, consistent with embodiments of the present disclosure. In step 301, video analysis system 101 receives at least one video. For example, video analysis system 101 may receive videos from database 107 or other website videos 108. In other embodiments, Video analysis system 101 may also receive a selection of a video from database 107 or other website videos 108. For example, an editor operating video analysis system 101 may select one or more videos stored on database 107 or other website videos 108, and video analysis system 101 may not actually retrieve the entirety of such videos in step 301. In some embodiments, the video have not previously been considered when creating a model for selecting thumbnails from videos.

In step 303, video analysis system 101 may determine at least one appropriate model for selecting thumbnails from the at least one video received in step 301. For example, an editor operating video analysis system 101 may select a pre-determined model for use with a particular type of video, or may select a particular model for use in selecting thumbnails.

In step 305, video analysis system 101 may extract thumbnails from the at least one video received in step 301. For example, feature extraction module 103 may receive the at least one video received in step 301, and may extract one or more thumbnails from those videos. These thumbnails may be extracted in accordance with a set of rules for extracting thumbnails, such as only extracting as thumbnails images that are sufficiently different from one another or not extracting as thumbnails blurry images or images substantially consisting of logos associated with the creator of the video.

In step 307, video analysis system 101 utilizes the model(s) determined in step 303 to select at least one thumbnail from the thumbnails extracted in step 305. For example, if a model determined in step 303 indicates thumbnails with action scenes yield a higher number of interactions (such as click-throughs), recommendation module 106 may select thumbnails with matching action scenes from the thumbnails extracted in step 305. As another example, if a determined model indicates that thumbnails with a red background yield a low number of interactions, recommendation module 106 may select thumbnails that do not have a red background.

In step 309, video analysis system 101 may operate on the extracted thumbnails selected in step 307. In some embodiments, thumbnails may be presented to a person (e.g., an editor) for selecting the thumbnails that will be used to promote associated videos. Such a person may manually select thumbnails for promoting the video on other web pages. For example, an editor may be tasked with selecting a thumbnail that fits in with a particular theme (such as a thumbnail with a red background or a thumbnail with multiple people in the frame). The editor may also select thumbnails based on other criteria.

Step 309 also represents a step where thumbnails are displayed on a web page (for example, a web page hosted and delivered by web server 109). User device 111 may request a web page from web server 109, and web server 109 may receive one or more thumbnails (e.g., from scheduling module 104) for embedding in the web page. Web server 109 may then deliver that web page to user device 111 with such thumbnails embedded. A user operating user device 111 may then click one or more of these embedded thumbnails, and video analysis system 101 may then receive feedback information related to the thumbnails delivered to user device 111.

In step 311, video analysis system 101 may then update the determined model to reflect the thumbnails selected in step 307. For example, if thumbnails were displayed to users in step 309, training module 105 may update the model determined in step 303 to reflect interaction performance of those thumbnails. If thumbnails were displayed to an editor in step 309, training module 105 may update the model determined in step 303 to reflect the thumbnails chosen by that editor.

Figure 4:
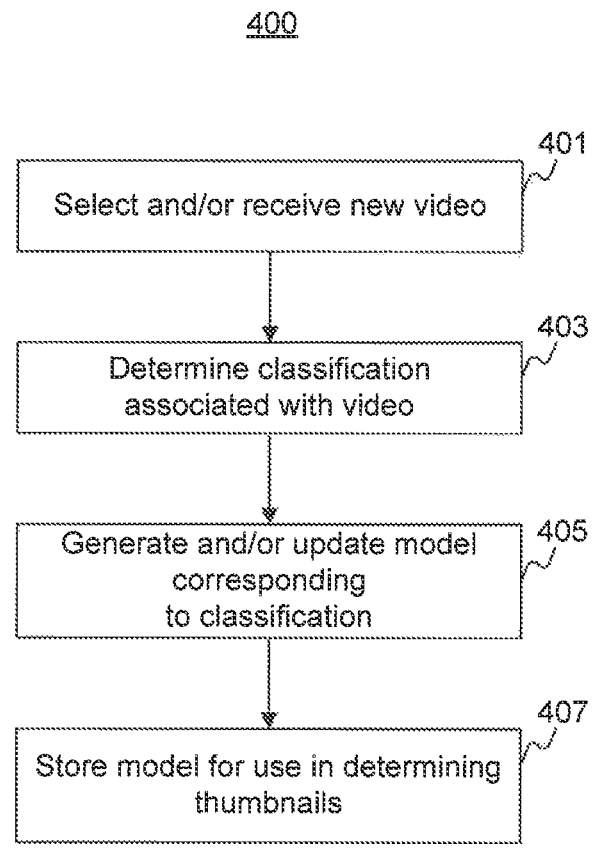
FIG. 4 illustrates a flowchart of an exemplary process for generating a model for use with particular classifications of videos, consistent with the embodiments of the present disclosure.

FIG. 4 illustrates a flowchart of an exemplary process 400 for generating a model for use with particular classifications of videos, consistent with the embodiments of the present disclosure. Process 400 starts at step 401. In step 401, video analysis system 101 receives at least one video. For example, video analysis system 101 may receive videos from database 107 or other website videos 108. In other embodiments, video analysis system 101 may also receive a selection of a video from database 107 or other website videos 108. For example, an editor operating video analysis system 101 may select one or more videos stored on database 107 or other website videos 108, and video analysis system 101 may retrieve only a portion of such videos in step 201.

In step 403, video analysis system 101 determines one or more classifications associated with the at least one video received in step 401. For example, video classification module 102 may determine classifications for a received video by determining data associated with the video (such as metadata, embedded information, or an owner/creator of the video) or may analyze elements of the video itself (such as frame rate or the presence/absence of objects or humans).

In step 405, video analysis system 101 generates and/or updates a model according to the classification determined in step 401. In some embodiments, the particular operations performed in step 405 may differ for each different classification. For example, a model corresponding to a "news" classification may utilize information such as associated metadata to select thumbnails, while a model corresponding to the "drama" classification may not use metadata in generating/updating the model.

In step 407, video analysis system 101 may store the generated/updated model for use in selecting or identifying thumbnails from future videos associated with the same classification(s) as those associated with the model. In some embodiments, the model can be stored in a database (such as database 107).

Figure 5:
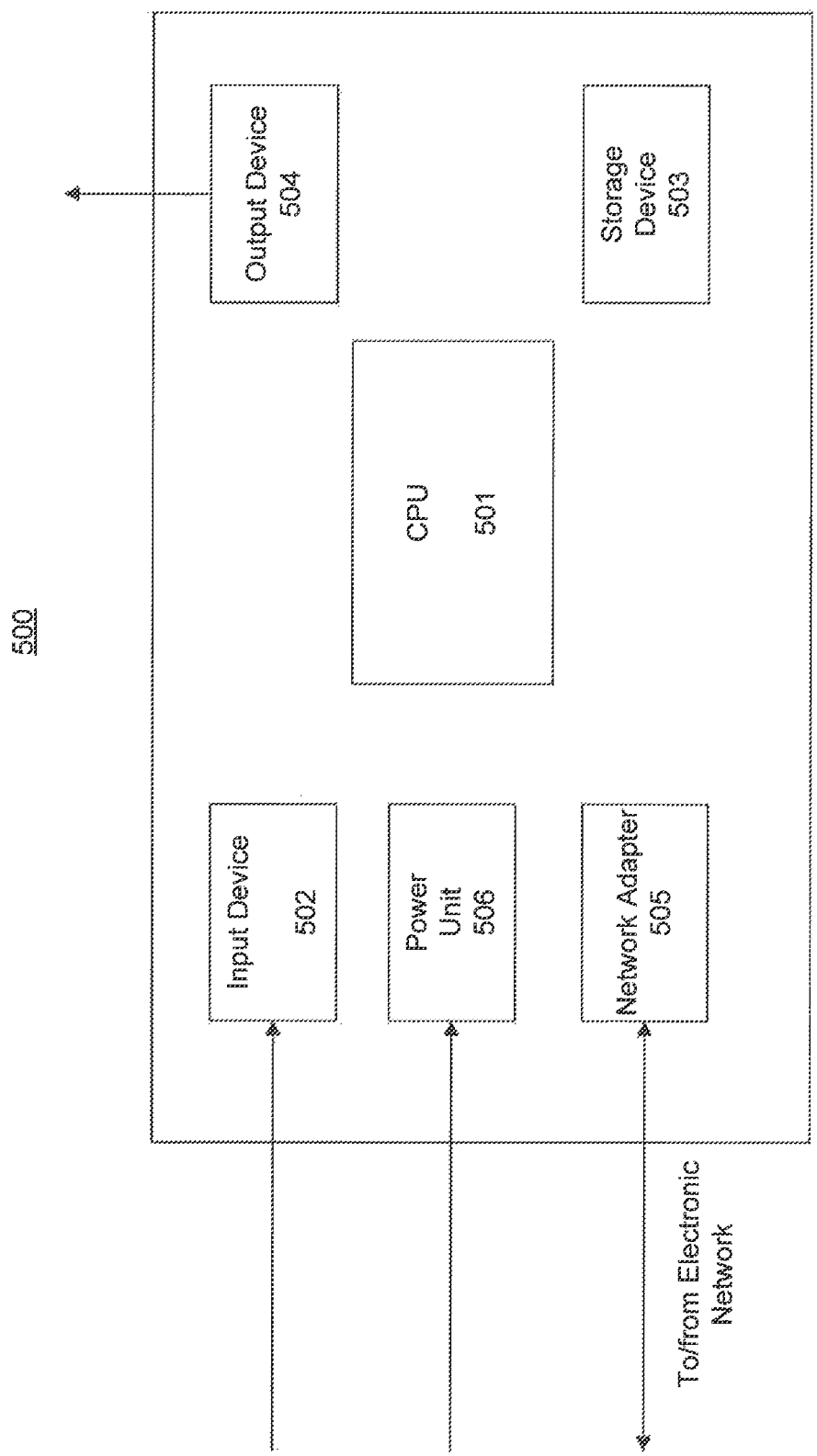
FIG. 5 illustrates an exemplary computer system for implementing embodiments of the present disclosure.

FIG. 5 illustrates an exemplary computer system 500 for implementing embodiments consistent with the present disclosure. Variations of computer system 500 may be used for implementing devices, as described in this specification. Such devices include those that would be understood or contemplated by those skilled in the art. Persons skilled in the art will also understand, from the present disclosure, that the components represented in FIG. 5 may be duplicated, omitted, or modified.

As shown in FIG. 5, exemplary computer system 500 may include a central processing unit 501 (also referred to as an electronic processor) for managing and processing data, as well as operations, consistent with the present disclosure. Computer system 500 also includes storage device 503. Storage device 503 comprises optical, magnetic, signal, and/or any other type of storage device. Computer system 500 may also include network adapter 505. Network adapter 505 allows computer system 500 to connect to electronic networks, such as the Internet, a local area network, a wide area network, a cellular network, a wireless network, or any other type of network. Computer system 500 also includes power unit 506, which may enable computer system 500 and its components to receive power and operate fully.

In some embodiments, computer system 500 may also include input device 502, which receive input from users and/or modules or devices. Such modules or devices may include, but are not limited to, keyboards, mice, trackballs, trackpads, scanners, cameras, and other devices which connect via Universal Serial Bus (USB), serial, parallel, infrared, wireless, wired, or other connections. Computer system 500 also includes output device 504, which transmit data to users and/or modules or devices. Such modules or devices may include, but are not limited to, computer monitors, televisions, screens, projectors, printers, plotters, and other recording/displaying devices which connect via wired or wireless connections.

The term "configured to," as used in this disclosure, is intended to encompass embodiments where a particular unit is programmed or is otherwise capable of performing the actions that follow the term. Moreover, while some embodiments are described in terms of sending data between devices or modules, these and other embodiments of the present disclosure encompass the sending of electrical signals between such devices or modules as well.

In this disclosure, various embodiments have been described with reference to the accompanying drawings and embodiments. It will, however, be evident that various modifications and changes may be made thereto, and additional embodiments may be implemented, without departing from the present disclosure. Furthermore, the specification and drawings are accordingly to be regarded in an illustrative rather than restrictive sense.

For example, advantageous results may still be achieved if steps of the disclosed methods were combined or performed in a different order and/or if components in the disclosed systems were combined in a different manner and/or replaced or supplemented by other components. Other implementations and modifications are also within the scope of the present disclosure.

It is to be understood that both the foregoing general description are exemplary and explanatory only, and are not restrictive. Further, the accompanying drawings, which are incorporated in and constitute a part of this specification, illustrate embodiments of the present disclosure and together with the description, and are similarly not restrictive.

What is claimed:

1. A computerized method comprising the following operations performed by at least one processor:
   extracting at least one thumbnail from a video;
   determining at least one feature present in the extracted at least one thumbnail;
   sending the extracted at least one thumbnail to one of an editor or at least one viewer;
   receiving, in response to sending the extracted at least one thumbnail to the editor or the at least one viewer, feedback information related to the at least one thumbnail, the feedback information comprising at least one of (i) response data associated with the at least one viewer or (ii) data identifying thumbnails selected by the editor;
   generating a model based on the determined at least one feature, the feedback information, and a classification of the at least one thumbnail into one or more groups; and
   storing the generated model for use in identifying thumbnails for other videos.

2. The method of claim 1, wherein the determined at least one feature comprises at least one of blurriness of the at least one thumbnail or video, colors present in the at least one thumbnail or video, presence or absence of items in the at least one thumbnail or video, or metadata associated with the video.

3. The method of claim 1, further comprising:
   receiving a second video; and
   determining, based on the generated model, thumbnails to extract from the second video.

4. The method of claim 1, further comprising determining at least one classification associated with the video, wherein generating the model further comprises generating the model based on the at least one classification associated with the video.

5. The method of claim 1, wherein extracting thumbnails further comprises:
   comparing pixel data of a first thumbnail to pixel data of a second thumbnail; and
   based on the comparison, utilizing at least one of the first thumbnail and second thumbnail as the extracted at least one thumbnail.

6. The method of claim 1, wherein generating the model comprises utilizing one or more weak classifiers with a boosting algorithm.

7. A tangible computer-readable storage medium, comprising instructions that, when executed by at least one processor, cause the at least one processor to perform the following operations:
   extracting at least one thumbnail from a video;
   determining at least one feature present in the extracted at least one thumbnail;
   sending the extracted at least one thumbnail to one of an editor or at least one viewer;
   receiving, in response to sending the extracted at least one thumbnail to the editor or the at least one viewer, feedback information related to the at least one thumbnail, the feedback information comprising at least one of (i) response data associated with the at least one viewer or (ii) data identifying thumbnails selected by the editor;
   generating a model based on the determined at least one feature, the feedback information, and a classification of the at least one thumbnail into one or more groups; and
   storing the generated model for use in identifying thumbnails for other videos.

8. The medium of claim 7, wherein the determined at least one feature comprises at least one of blurriness of the at least one thumbnail or video, colors present in the at least one thumbnail or video, presence or absence of items in the at least one thumbnail or video, or metadata associated with the video.

9. The medium of claim 7, wherein the instructions further cause the at least one processor to perform operations comprising:
   receiving a second video; and
   determining, based on the generated model, thumbnails to extract from the second video.

10. The medium of claim 7, wherein the instructions further cause the at least one processor to perform operations comprising determining at least one classification associated with the video, wherein generating the model further comprises generating the model based on the at least one classification associated with the video.

11. The medium of claim 7, wherein extracting thumbnails further comprises:
   comparing pixel data of a first thumbnail to pixel data of a second thumbnail; and
   based on the comparison, utilizing at least one of the first thumbnail and second thumbnail as the extracted at least one thumbnail.

12. The medium of claim 7, wherein generating the model comprises utilizing one or more weak classifiers with a boosting algorithm.

13. A computerized system, comprising:
   at least one processor; and
   a storage medium comprising instructions that, when executed by the at least one processor, configure the at least one processor to perform the following operations:
   extracting at least one thumbnail from a video;
   determining at least one feature present in the extracted at least one thumbnail;
   sending the extracted at least one thumbnail to one of an editor or at least one viewer;
   receiving, in response to sending the extracted at least one thumbnail to the editor or the at least one viewer, feedback information related to the at least one thumbnail, the feedback information comprising at least one of (i) response data associated with the at least one viewer or (ii) data identifying thumbnails selected by the editor;
   generating a model based on the determined at least one feature, the feedback information, and a classification of the at least one thumbnail into one or more groups; and
   storing the generated model for use in identifying thumbnails for other videos.

14. The system of claim 13, wherein the determined at least one feature comprises at least one of blurriness of the at least one thumbnail or video, colors present in the at least one thumbnail or video, presence or absence of items in the at least one thumbnail or video, or metadata associated with the video.

15. The system of claim 13, wherein the instructions further cause the at least one processor to perform operations comprising:
   receiving a second video; and
   determining, based on the generated model, thumbnails to extract from the second video.

16. The system of claim 13, further wherein the instructions further cause the at least one processor to perform operations comprising determining at least one classification associated with the video, wherein generating the model further comprises generating the model based on the at least one classification associated with the video.

17. The system of claim 13, wherein extracting thumbnails further comprises:
   comparing pixel data of a first thumbnail to pixel data of a second thumbnail; and
   based on the comparison, utilizing at least one of the first thumbnail and second thumbnail as the extracted at least one thumbnail.

18. A computerized method comprising the following operations performed by at least one processor:
   determining, based on a first video, a model for extracting one or more thumbnails from the first video;
   extracting one or more thumbnails from the first video;
   selecting at least one of the one or more extracted thumbnails;
   sending the selected at least one thumbnail to one of an editor or at least one viewer;
   receiving, in response to sending the selected at least one thumbnail to the editor or the at least one viewer, feedback information related to the at least one thumbnail, the feedback information comprising at least one of (i) response data associated with the at least one viewer or (ii) data identifying thumbnails selected by the editor; and
   updating the determined model based on the feedback information.

19. The method of claim 1, further comprising:
   determining at least one classification associated with the video; and
   identifying at least one stored model based on the at least one classification associated with the video.

20. The medium of claim 7, wherein the instructions further cause the at least one processor to perform operations comprising:
   determining at least one classification associated with the video; and
   identifying at least one stored model based on the at least one classification associated with the video.

21. The system of claim 13, wherein the instructions further cause the at least one processor to perform operations comprising:
   determining at least one classification associated with the video; and
   identifying at least one stored model based on the at least one classification associated with the video.

* * * * *